(12) United States Patent
Albrecht (10) Patent No.: US 11,992,123 B2
(45) Date of Patent: May 28, 2024

(54) DEVICE FOR GUIDING A MOVABLE FURNITURE PART RELATIVE TO A FURNITURE CARCASS

(71) Applicant: Grass GmbH, Hoechst (AT)

(72) Inventor: Markus Albrecht, Lustenau (AT)

(73) Assignee: Grass GmbH, Hoechst (AT)

( * ) Notice: Subject to any disclaimer, the term of this patent is extended or adjusted under 35 U.S.C. 154(b) by 0 days.

(21) Appl. No.: 18/053,826

(22) Filed: Nov. 9, 2022

(65) Prior Publication Data

US 2023/0148751 A1    May 18, 2023

(30) Foreign Application Priority Data

Nov. 15, 2021   (DE) .................... 10 2021 129 646.3

(51) Int. Cl.
*A47B 88/493*      (2017.01)

(52) U.S. Cl.
CPC .... *A47B 88/493* (2017.01); *A47B 2210/0035* (2013.01); *A47B 2210/004* (2013.01)

(58) Field of Classification Search
CPC . A47B 88/437; A47B 88/0466; A47B 88/487; A47B 88/14; A47B 88/493; A47B 88/10; A47B 88/60; A47B 88/18; A47B 88/467; A47B 88/047; A47B 2210/0002; A47B 2210/0008; A47B 2210/001; A47B 2210/0029; A47B 2210/0032;
(Continued)

(56) References Cited

U.S. PATENT DOCUMENTS 1,560,887 A * 11/1925 Watson ................ A47B 88/493
                                                           312/334.13
3,053,603 A *  9/1962 Schapiro ................ A47B 88/48
                                                           312/351
(Continued)

FOREIGN PATENT DOCUMENTS

DE    20 2004 010 675 U1   12/2004
DE    20 2006 006 180 U1   10/2007
(Continued)

OTHER PUBLICATIONS

German Search Report (Application No. 10 2021 129 646.3) dated Sep. 12, 2022.
(Continued)

*Primary Examiner* — Andrew M Roersma
(74) *Attorney, Agent, or Firm* — BURR PATENT LAW, PLLC (57) ABSTRACT

A device for guiding a movable furniture part on a furniture carcass. The device includes a carcass rail arranged on the furniture carcass and a movable rail movable in the opening and closing direction relative to the carcass rail. The carcass rail and the movable rail each have a flat running web and load-transmitting rolling elements are each arranged between a running web of the carcass rail and a running web of the movable rail. During relative movement between the rails, the rolling elements move along the running webs. The running webs are uninterrupted, and the rolling elements between the rails are configured such that, in the mounted state, the running web of the movable rail is always oriented obliquely relative to the running web of the carcass rail.

15 Claims, 5 Drawing Sheets

(58) Field of Classification Search
CPC .... A47B 2210/0035; A47B 2210/0037; A47B 2210/004; A47B 2210/0043

See application file for complete search history.

(56) References Cited

U.S. PATENT DOCUMENTS

| | | | | |
|---|---|---|---|---|
| 4,615,095 | A | * | 10/1986 | Bessinger ............ A47B 88/467 312/333 |
| 5,056,879 | A | * | 10/1991 | Rock .................... A47B 88/467 312/334.27 |
| 9,125,491 | B2 | * | 9/2015 | Rehage ................ A47B 88/467 |
| 9,357,843 | B2 | * | 6/2016 | Jährling ................ F16C 29/005 |
| 9,894,992 | B2 | | 2/2018 | Berchtold et al. |
| 2011/0006652 | A1 | * | 1/2011 | Veltrop ................ F25D 23/087 277/345 |
| 2012/0248956 | A1 | | 10/2012 | Netzer |
| 2021/0037971 | A1 | * | 2/2021 | Andersson ........... A47B 88/433 |
| 2021/0037972 | A1 | * | 2/2021 | Seo ........................ F16C 29/005 |
| 2023/0117910 | A1 | * | 4/2023 | Nachbaur ............ A47B 88/493 312/334.8 |

FOREIGN PATENT DOCUMENTS

| | | | | |
|---|---|---|---|---|
| DE | 10 2013 207 037 | A1 | | 10/2014 |
| DE | 102013205753 | A1 | * | 10/2014 ............. A47B 88/18 |
| DE | 21 2016 000 215 | U1 | | 7/2018 |
| EP | 2112436 | A1 | * | 10/2009 ............. F24C 15/162 |
| EP | 2792273 | A1 | * | 10/2014 ............. A47B 88/467 |
| WO | WO-2017000003 | A1 | * | 1/2017 ............. A47B 88/487 |
| WO | WO-2019001954 | A1 | * | 1/2019 |

OTHER PUBLICATIONS

Extended European Search Report (Application No. 22204971.0) dated Apr. 5, 2023.

* cited by examiner

DEVICE FOR GUIDING A MOVABLE FURNITURE PART RELATIVE TO A FURNITURE CARCASS

This application claims the benefit under 35 USC § 119(a)-(d) of German Application No. 10 2021 129 646.3 filed Nov. 15, 2021, the entirety of which is incorporated herein by reference.

FIELD OF THE INVENTION

The present invention relates to a device for guiding a movable furniture part relative to a furniture carcass.

BACKGROUND OF THE INVENTION

There are already known devices with rails for guiding a movable furniture part, such as a drawer, wherein lowering of the movable furniture part relative to the furniture carcass in the open state of the movable furniture part is counteracted.

In known devices, the configuration of a carcass rail or a movable rail is changed, for example, by an interruption in the running web of the rails.

SUMMARY OF THE INVENTION

It is the object of the present invention to provide an improved device for guiding a movable furniture part relative to a furniture carcass, in particular, with regard to a compact and simple construction.

The present invention starts from a device for guiding a movable furniture part, in particular, a drawer, wherein the movable furniture part can be received movably on a furniture carcass by means of the device, wherein the device comprises a carcass rail and a movable rail, wherein the carcass rail can be arranged on the furniture carcass, wherein the movably mounted movable rail can be moved in the opening and closing direction relative to the carcass rail, wherein the carcass rail and the movable rail each have a flat running web, wherein load-transmitting rolling elements are each arranged between a running web of the carcass rail and a running web of the movable rail, wherein, during the relative movement between the movable rail and the carcass rail, the load-transmitting rolling elements can be moved along the running webs of the carcass rail and the movable rail.

The device is preferably a drawer pull-out guide, in particular, for example, a partial- or full-extension runner. In the case of a partial-extension runner, it is preferable if there is only precisely one movable rail in addition to the carcass rail. In the case of a full-extension runner, there are preferably precisely two movable rails, such as, for example, a central rail and a drawer rail. When the movable furniture part is moved in the opening and closing direction, the movable rail or rails can be moved relative to the carcass rail. Furthermore, during the opening and closing movement of the movable furniture part, a first movable rail, such as, for example, a central rail, can preferably also be moved relative to a second movable rail, such as, for example, a drawer rail.

The piece of furniture preferably has two identical devices for each movable furniture part, wherein preferably one device is arranged on, for example, each side wall of the furniture carcass. In the mounted state, the carcass rail is preferably secured on the furniture carcass. The movable rail, such as, for example, the drawer rail, is preferably connected to the movable furniture part, wherein the movable rail is, for example, accommodated in an interior of a side frame of a movable furniture part or is arranged below a base and/or side wall of the movable furniture part. Advantageously, the movable rail together with the movable furniture part can be moved linearly relative to the carcass rail, which is arranged, for example, in a fixed position on a side wall of the furniture carcass, wherein the movable rail can be moved in the opening and closing direction relative to the carcass rail.

The carcass rail can preferably have precisely one running web or precisely two running webs. The running webs of the carcass rail are preferably oriented horizontally in the mounted state of the device. The running web preferably has two surfaces, the upper and lower surfaces preferably being arranged on opposite sides of the running web and being separated from one another by the material thickness of the running web. If load-transmitting rolling elements are moved along the surface of the running web, these surfaces are also referred to as running surfaces. If the carcass rail has a single running web, this running web preferably has two running surfaces. If the carcass rail has two running webs, each running web preferably has just one running surface.

The movable rail can also preferably have a single running web or two running webs, and, in the case of a single running web, this running web preferably has two running surfaces. In the case of two running webs, each running web preferably has just one running surface or two running surfaces. In this case, the running surfaces of the movable rail are designed to be flat, for example.

The load-transmitting rolling elements can preferably be moved in the opening and closing direction along the running surfaces of the running webs of the rails. During the opening and closing movement of the movable furniture part, the rolling elements are moved along the horizontally oriented running web of the carcass rail mounted on the furniture carcass, wherein the movable rail is moved relative to the carcass rail.

The essence of the present invention is that the running web of the carcass rail and the running web of the movable rail are uninterrupted, wherein the rolling elements between the carcass rail and the movable rail are configured in such a way that, in the mounted state, the running web of the movable rail is always oriented obliquely relative to the horizontally oriented running web of the carcass rail.

The running webs or the running surfaces of the carcass rail and the movable rail are advantageously designed to be uninterrupted or not interrupted. This means, for example, that there is no space or gaps or a contour which differs from the flat running surfaces in the running web or running surface. This has the advantage that the rolling elements can be moved along the entire running surfaces of the carcass rail and movable rail and that smooth running of the movable rail or of the movable rails in the opening and closing direction is ensured.

The oblique position of the running web of the movable rail is preferably not changed during the opening and closing movement of the movable furniture part. The rolling elements which are arranged between the running web of the carcass rail and the running web of the movable rail are advantageously configured in such a way that the movement of the movable rail in the opening and closing direction does not change the orientation of the movable rail unless the movable furniture part acts with a force or a weight on the movable rails in the open state of the movable furniture part.

Owing to the oblique position of the running web or running webs of the movable rail, particularly in the open state of the movable furniture part or in the extended state of the movable rail, it is advantageously possible to compensate for lowering of the movable furniture part, in particular, of a fully loaded movable furniture part. This is because, in the case of standard devices for guiding a movable furniture part, the movable furniture part or the drawer rail is deflected downward in the direction of the carcass rail or obliquely with respect to a horizontal in the open state by the weight of the movable furniture part or the contents of the movable furniture part.

In the device according to the present invention, the oblique orientation of the running webs of the movable rail ensures that the running webs or running surfaces of the movable rail are pushed or deflected from an oblique position into an approximately horizontal position by the weight of the movable furniture part. As a result, in contrast to the standard devices, the movable furniture part, in particular, a heavy movable furniture part, can advantageously be closed without great expenditure of force. The magnitude of the oblique position of the movable rail is preferably matched to a magnitude of an expected weight of the movable furniture part, ensuring that an approximately horizontal position of the movable furniture part is achieved in the open position.

It is advantageous that a rolling element carriage has rolling element rows, each having a plurality of rolling elements.

The rolling elements of a rolling element row are preferably of identical configuration or have the same or an identical outer contour and material.

The number of rolling elements in a rolling element row can vary for different rolling element rows. For example, one rolling element row can have precisely two, precisely three, precisely four, etc., and another rolling element row can have precisely two, precisely three, precisely four, precisely five, etc., rolling elements. At least two rolling elements are preferably arranged in the rolling element rows. Also conceivable are rolling element rows with precisely three, precisely four, precisely five, precisely six, precisely seven, precisely eight, precisely nine, precisely ten, etc. rolling elements.

It is likewise advantageous that the diameter of all the rolling elements of a rolling element row is the same.

The rolling elements are preferably cylindrical, wherein the diameter, in particular the diameter of the base surface of the cylinder, of the rolling elements of a rolling element row is preferably the same. Furthermore, the rolling elements can also be designed as balls; in the case of spherical rolling elements too, the diameter of the rolling elements of a rolling element row is preferably the same.

It is furthermore conceivable that the diameters of the rolling elements in a rolling element row differ; e.g. the diameters of the rolling elements of the rolling element row can increase or decrease in the opening direction.

It is likewise advantageous that there is a single rolling element carriage having four rolling element rows, wherein there are two rolling element rows between the running web of the carcass rail and an upper running web of the movable rail and there are two rolling element rows between the running web of the carcass rail and a lower running web of the movable rail.

The movable rail preferably has precisely two running webs. In this case, the horizontally oriented running web of the carcass rail is preferably arranged between the two running webs of the movable rail in the mounted state of the device. Respective rolling elements of the rolling element row are preferably arranged between the running webs of the movable rail and the running web of the carcass rail, and therefore rolling elements are moved along the precisely one running web of the carcass rail on an upper running surface and a lower running surface, the running surfaces of the carcass rail being spaced apart from one another by the thickness of the running web. In the case of the movable rail, as a preferred option, on the upper running web of the movable rail situated above the running web of the carcass rail, it is only possible for rolling elements of the rolling element row to be moved along the lower running surface, which is oriented toward the running web of the carcass rail, and, on the lower running web of the movable rail situated below the running web of the carcass rail, it is only possible for rolling elements of the rolling element rows to be moved along the upper running surface, which is oriented toward the running web of the carcass rail.

Precisely two rolling element rows are preferably arranged between the upper running surface of the running web of the carcass rail and the lower running surface of the upper running web of the movable rail. The rolling elements of the two rolling element rows which are arranged between the upper running web of the movable rail and the running web of the central rail preferably have a diameter of 4.5 to 6.5 mm. It is furthermore preferred that precisely two rolling element rows are arranged between the lower running surface of the running web of the carcass rail and the upper running surface of the lower running web of the movable rail. The rolling elements of the two rolling element rows which are arranged between the lower running web of the movable rail and the running web of the central rail preferably have a diameter of 6.2 to 7.7 mm.

The rolling elements of the rolling element rows which are arranged between the running web of the carcass rail and the running webs of the movable rail are preferably arranged on a rolling element carriage, with the result that all the rolling elements are moved simultaneously in the opening or closing direction along the running surfaces of the running webs of the movable rail and the carcass rail.

It is also advantageous that there is a single rolling element carriage having four rolling element rows, wherein there are two rolling element rows between the running web of the movable rail and an upper running web of the carcass rail and there are two rolling element rows between the running web of the movable rail and a lower running web of the carcass rail.

The carcass rail preferably has precisely two running webs. In this case, the running web of the movable rail is preferably arranged between the two horizontally oriented running webs of the carcass rail in the mounted state of the device. Respective rolling elements of the rolling element row are preferably arranged between the running webs of the carcass rail and the running web of the movable rail, and therefore rolling elements are moved along the running web of the movable rail on an upper running surface and a lower running surface, the running surfaces being spaced apart from one another by the thickness of the running web. In the case of the carcass rail, as a preferred option, on the upper running web of the carcass rail situated above the running web of the movable rail, it is only possible for rolling elements of the rolling element row to be moved along the lower running surface, which is oriented toward the running web of the movable rail, and, on the lower running web of the carcass rail situated below the running web of the movable rail, it is only possible for rolling elements of the rolling element rows to be moved along the upper running surface, which is oriented toward the running web of the movable rail.

Precisely two rolling element rows are preferably arranged between the upper running surface of the running web of the movable rail and the lower running surface of the upper running web of the carcass rail. It is furthermore preferred if precisely two rolling element rows are arranged between the lower running surface of the running web of the movable rail and the upper running surface of the lower running web of the carcass rail.

The rolling elements of the rolling element rows which are arranged between the running web of the movable rail and the running webs of the carcass rail are preferably arranged on a rolling element carriage, with the result that all the rolling elements are moved simultaneously in the opening or closing direction along the running surfaces of the running web of the movable rail and the running webs of the carcass rail.

Advantageously, there are two rolling element carriages with in each case two rolling element rows.

The two rolling element carriages are preferably spaced apart from one another in the mounted state of the device, in particular, are spaced apart from one another horizontally.

The movement of the two rolling element carriages in the opening and closing direction is preferably synchronized. For this purpose, the two rolling element carriages can be connected to one another by a synchronizing rod, for example.

Once the precisely one running web of the carcass rail is arranged between the precisely two running webs of the movable rail, then, in the case of each rolling element carriage, one rolling element row is advantageously present between the upper running surface of the running web of the carcass rail and the lower running surface of the upper running web of the movable rail and one rolling element row is present between the lower running surface of the running web of the carcass rail and the upper running surface of the lower running web of the movable rail.

Once the precisely one running web of the movable rail is arranged between the precisely two running webs of the carcass rail, then, in the case of each rolling element carriage, one rolling element row is present between the upper running surface of the running web of the movable rail and the lower running surface of the upper running web of the carcass rail and one rolling element row is present between the lower running surface of the running web of the movable rail and the upper running surface of the lower running web of the carcass rail.

It is advantageous that the rolling elements of two rolling element rows each have different diameters, wherein one rolling element row is arranged between the running web of the carcass rail and the upper running web of the movable rail and one rolling element row is arranged between the running web of the carcass rail and the lower running web of the movable rail.

Preferably, precisely two rolling element rows are arranged at the front of the rolling element carriage in the opening direction, wherein the rolling elements of the rolling element row which are arranged between the upper running web of the movable rail and the running web of the carcass rail have a larger diameter than the rolling elements of a rolling element row which are arranged between the lower running web of the movable rail and the running web of the carcass rail. In this case, the difference in the diameters is preferably from 0.4 mm to 0.95 mm.

In the two rolling element rows which are arranged at the rear of the rolling element carriage in the opening direction, the rolling elements of the rolling element row which are arranged between the upper running web of the movable rail and the running web of the carcass rail have a smaller diameter than the rolling elements of a rolling element row which are arranged between the lower running web of the movable rail and the running web of the carcass rail. In this case, the difference in the diameters is preferably from 1 mm to 2.5 mm.

It is advantageous that the rolling elements of two rolling element rows each have different diameters, wherein one rolling element row is arranged between the running web of the movable rail and the upper running web of the carcass rail and one rolling element row is arranged between the running web of the movable rail and the lower running web of the carcass rail.

Preferably, precisely two rolling element rows are arranged at the front of the rolling element carriage in the opening direction, wherein the rolling elements of the rolling element row which are arranged between the upper running web of the carcass rail and the running web of the movable rail have a smaller diameter than the rolling elements of a rolling element row which are arranged between the lower running web of the carcass rail and the running web of the movable rail.

In the two rolling element rows which are arranged at the rear of the rolling element carriage in the opening direction, the rolling elements of the rolling element row which are arranged between the upper running web of the carcass rail and the running web of the movable rail have a larger diameter than the rolling elements of a rolling element row which are arranged between the lower running web of the carcass rail and the running web of the movable rail.

It is also advantageous that the diameter of the rolling elements of the rolling element row which is at the front in the opening direction is different from the diameter of the rolling elements of the rear rolling element rows.

In the embodiment in which the precisely one running web of the carcass rail is arranged between precisely two running webs of the movable rail, the diameter of the rolling elements of the rolling element row at the front in the opening direction is preferably smaller than that of the rear rolling element row, in the case of the rolling element rows which are arranged between the running web of the carcass rail and the running surface of the lower running web of the movable rail. In this case, the difference in the diameters is preferably from 0.5 mm to 0.95 mm. Furthermore, the diameter of the rolling elements of the rolling element row which is at the front in the opening direction is advantageously larger than that of the rear rolling element row, in the case of the rolling element rows which are arranged between the running web of the carcass rail and the running surface of the upper running web of the movable rail. Here too, the difference in the diameters is preferably from 0.4 mm to 0.95 mm. For example, the difference in the diameters of the rolling elements of the rolling element row which are at the front in the opening direction with respect to the rear rolling elements of the rolling element row, in the case of the rolling elements which are arranged between the running web of the carcass rail and a running web of the movable rail, is the same.

In the embodiment in which the precisely one running web of the movable rail is arranged between precisely two running webs of the carcass rail, the diameter of the rolling elements of the rolling element row at the front in the opening direction is preferably larger than that of the rear rolling element row, in the case of the rolling element rows which are arranged between the running web of the movable rail and the running surface of the lower running web of the carcass rail. Furthermore, the diameter of the rolling elements of the rolling element row which is at the front in the opening direction is advantageously smaller than that of the rear rolling element row, in the case of the rolling element rows which are arranged between the running web of the movable rail and the running surface of the upper running web of the carcass rail.

It is advantageous that the sum of the diameters of the rolling elements of the two rolling element rows which are at the front in the opening direction is equal to the sum of the diameters of the rolling elements of the two rear rolling element rows.

This advantageously ensures that the oblique position of the two running webs of the movable rail is the same when the running web of the carcass rail is arranged between two running webs of the movable rail. This is because the difference of the diameters of rolling elements of the rolling element row which are at the front in the opening direction with respect to the rear rolling elements of the rolling element row, which are arranged between the upper running web of the movable rail and the running web of the carcass rail, is the same as the difference of the diameter of the rolling elements of the rolling element row which are at the front in the opening direction with respect to the rear rolling elements of a rolling element row, which are arranged between the lower running web of the movable rail and the running web of the carcass rail.

In the variant in which the running web of the movable rail is arranged between two running webs of the carcass rail, the fact that the sum of the diameters of the rolling elements of the two front rolling element rows in the opening direction is equal to the sum of the diameters of the rolling elements of the two rear rolling element rows ensures that advantageously only the running web or running webs of the movable rail are oriented obliquely and the running webs of the carcass rail remain horizontally oriented.

For example, the diameter of those rolling elements of the rolling element rows which are at the front in the opening direction, which rows are arranged between the running web of the carcass rail and the upper running web of the movable rail, is different from the other rolling elements of the other rolling element rows. The rolling elements of the different rolling element rows preferably each have different diameters from one another.

It is also advantageous that the movable rail is a drawer rail.

It is likewise advantageous that the movable rail is a central rail.

The device preferably has two movable rails, wherein a first movable rail is designed as a central rail and a second movable rail is designed as a drawer rail.

The device or the drawer pull-out guide is preferably designed as a full-extension runner, wherein the central rail is preferably arranged between the carcass rail and the drawer rail. As a preferred option, the central rail and the drawer rail can be moved relative to the carcass rail and the drawer rail can be moved relative to the central rail.

It is advantageous that two rolling element rows are arranged between a running web of the drawer rail and a running web of the central rail, wherein the rolling elements of one rolling element row have a different diameter than the rolling elements of the other rolling element row.

In one variant of the present invention, the precisely one running web of the carcass rail is preferably arranged between precisely two running webs of the central rail, with preferably precisely one running web of the drawer rail being arranged above the upper running web of the central rail. It is furthermore preferred that two rolling element rows are arranged between the upper running web of the central rail and the running web of the drawer rail. The rolling elements of the two rolling element rows preferably have a diameter of 3.5 to 4.5 mm. In this case, the diameters of the rolling elements of the rolling element row which is at the front in the opening direction are advantageously larger than those of the rear rolling element rows. In this case, the difference in the diameters is preferably from 0.1 mm to 0.3 mm. The rolling elements of a rolling element row preferably have the same diameters. In this way, it is advantageously possible to ensure that the running web of the drawer rail is oriented obliquely relative to the running web or running webs of the central rail, wherein the running webs of the central rail are already oriented obliquely relative to the horizontally oriented running web of the carcass rail. As a result, the running web of the drawer rail is preferably oriented obliquely further upward.

As a preferred option, in a further variant, a lower running web of the central rail is arranged between precisely two running webs of the carcass rail and an upper running web of the central rail is arranged between precisely two running webs of the drawer rail. As a preferred option, two rolling element rows are arranged between a lower running web of the drawer rail and the upper running web of the central rail and two rolling element rows are arranged between an upper running web of the drawer rail and the upper running web of the central rail.

The rolling elements of a rolling element row preferably have the same diameters. The rolling elements of the rolling element row which are arranged between the upper running web of the drawer rail and the upper running web of the central rail preferably have a larger diameter than the rolling elements of a rolling element row which are arranged between the lower running web of the drawer rail and the upper running web of the central rail. In the two rolling element rows which are arranged at the rear of the rolling element carriage in the opening direction, the rolling elements of the rolling element row which are arranged between the upper running web of the drawer rail and the upper running web of the central rail have a smaller diameter than the rolling elements of a rolling element row which are arranged between the lower running web of the drawer rail and the upper running web of the central rail.

Moreover, the diameter of the rolling elements of the rolling element row which is at the front in the opening direction is preferably smaller than that of the rear rolling element row, in the case of the rolling element rows which are arranged between the upper running web of the central rail and the lower running web of the drawer rail. Furthermore, the diameter of the rolling elements of the rolling element row which is at the front in the opening direction is advantageously larger than that of the rear rolling element row, in the case of the rolling element rows which are arranged between the upper running web of the central rail and the upper running web of the drawer rail.

An advantageous embodiment of the present invention is a piece of furniture having a movable furniture part and a furniture carcass, wherein the movable furniture part can be moved in the opening and closing direction, being guided relative to the furniture carcass, by a device in accordance with one of the above described embodiments.

On the piece of furniture, the movable furniture part is designed as a drawer, for example. The piece of furniture preferably has, for example, a plurality of drawers, wherein preferably one or two devices according to one of the above described embodiments are arranged on each drawer, thus enabling the drawers to be moved in the opening and closing direction by the devices.

BRIEF DESCRIPTION OF THE DRAWINGS

Further features and advantages of the present invention are explained in detail by means of an exemplary embodiment illustrated schematically in the figures.

DETAILED DESCRIPTION OF THE INVENTION

Figure 1:
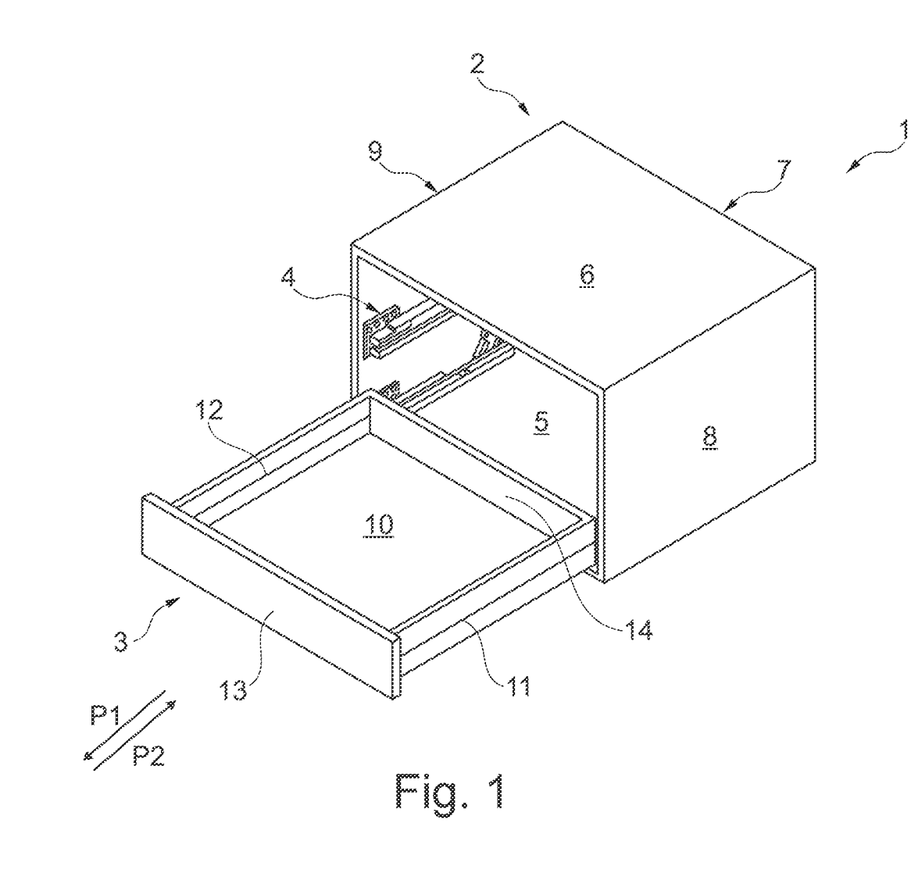
FIG. 1 shows a piece of furniture in perspective obliquely from above with a drawer in the fully open state on a furniture carcass, wherein the drawer can be moved in the opening and closing direction by a device according to the present invention.

A piece of furniture 1 having a furniture carcass 2 and a furniture part 3 which can be moved relative to the furniture carcass 2 and which is designed as a drawer is illustrated in FIG. 1. The movable furniture part 3 can be moved in the opening direction P1 and the closing direction P2 relative to the furniture carcass 2 by means of the device 4 according to the present invention, such as, for example, a drawer pull-out guide. The furniture carcass 2 has a base 5, an upper panel 6, a rear wall 7 and two side walls 8, 9. The movable furniture part 3 preferably has a drawer bottom 10, drawer side walls 11, 12, a drawer front 13 and a drawer rear wall 14. Furthermore, the movable furniture part 3 can also have a side frame 16.

The device 4 is preferably secured on the side walls 8, 9 of the furniture carcass 2. The device 4, which here is designed, for example, as a full-extension runner, preferably has a carcass rail 15, wherein the carcass rail 15 is mounted on the side wall 8, 9 of the furniture carcass 2. The carcass rail 15 preferably has a fastening plate 17 for attachment to the side wall 8, 9 of the furniture carcass 2, wherein the fastening plate 17 can be mounted on the side wall 8, 9 by means of fastening mechanisms, such as, for example, screws. Advantageously, a carcass rail 15 is attached to each side wall 8, 9 of the furniture carcass 2, wherein the carcass rails 15 are preferably attached to the side walls 8, 9 of the furniture carcass 2 in a mirror-symmetrical manner.

The device 4 in FIGS. 2 to 7 is designed as a full-extension runner and preferably has two movable rails, wherein preferably one movable rail is configured as a central rail 18 and one movable rail is designed as a drawer rail 19. The central rail 18 is preferably arranged between the carcass rail 15 and the drawer rail 19, wherein the central rail 18 and the drawer rail 19 are movable relative to the carcass rail 15. The drawer rail 19 can preferably be moved relative to the central rail 18 in the opening direction P1 and the closing direction P2.

Figures 2, 3:
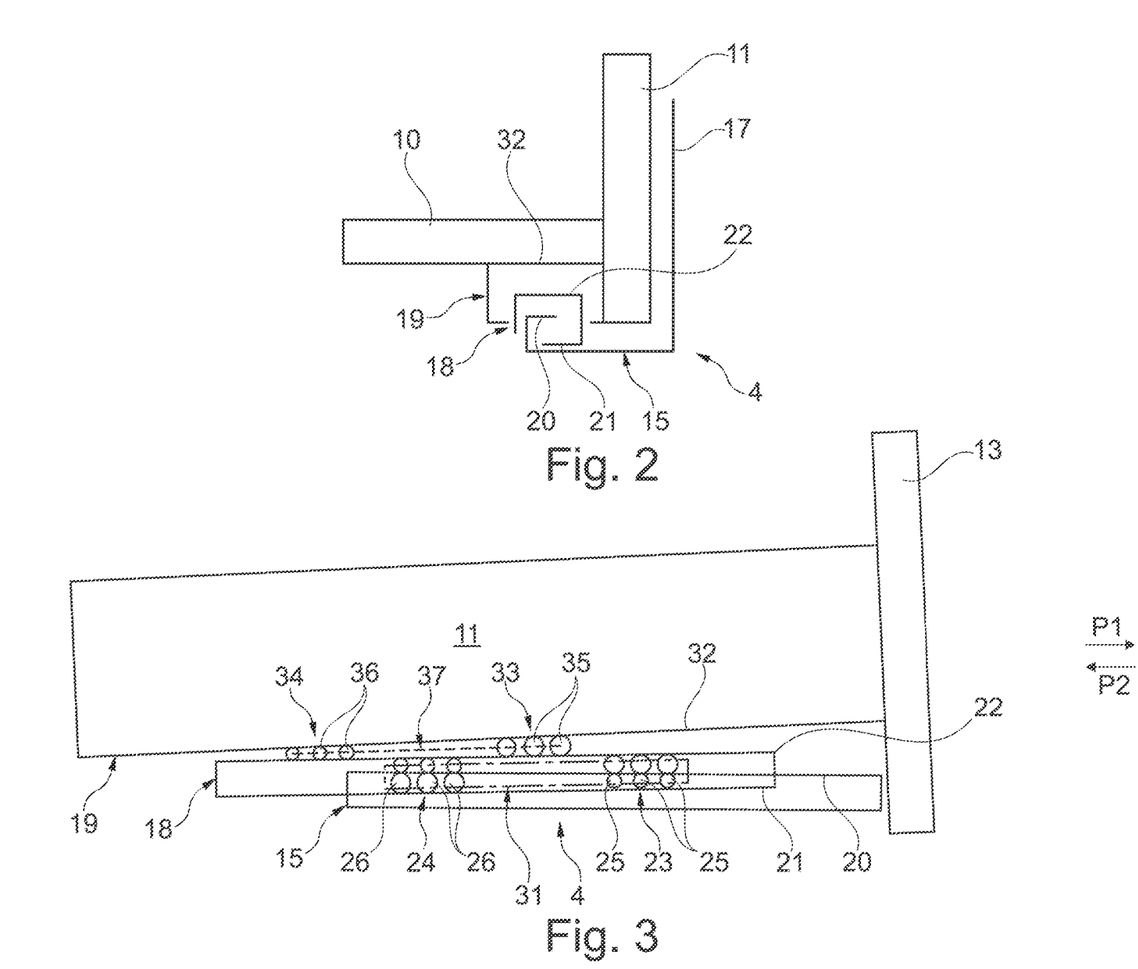
FIG. 2 shows a highly schematic sectional illustration of a part of a drawer and a device without rolling elements according to FIG. 1.
FIG. 3 shows a side view of a drawer with mounted device according to FIG. 2 in the closed state of the drawer.

The device 4 or the drawer rail 19 of the device 4 is preferably connected to an underside of the drawer bottom 10 and/or an underside of the drawer side wall 11, 12 or side surface of the drawer side wall 11, 12 (see FIG. 2). Furthermore, it is conceivable that the device 4 is accommodated in a cavity of a side frame 16, wherein, for example, the drawer rail 19 is connected to the side frame 16 (see FIG. 5).

Figure 4:
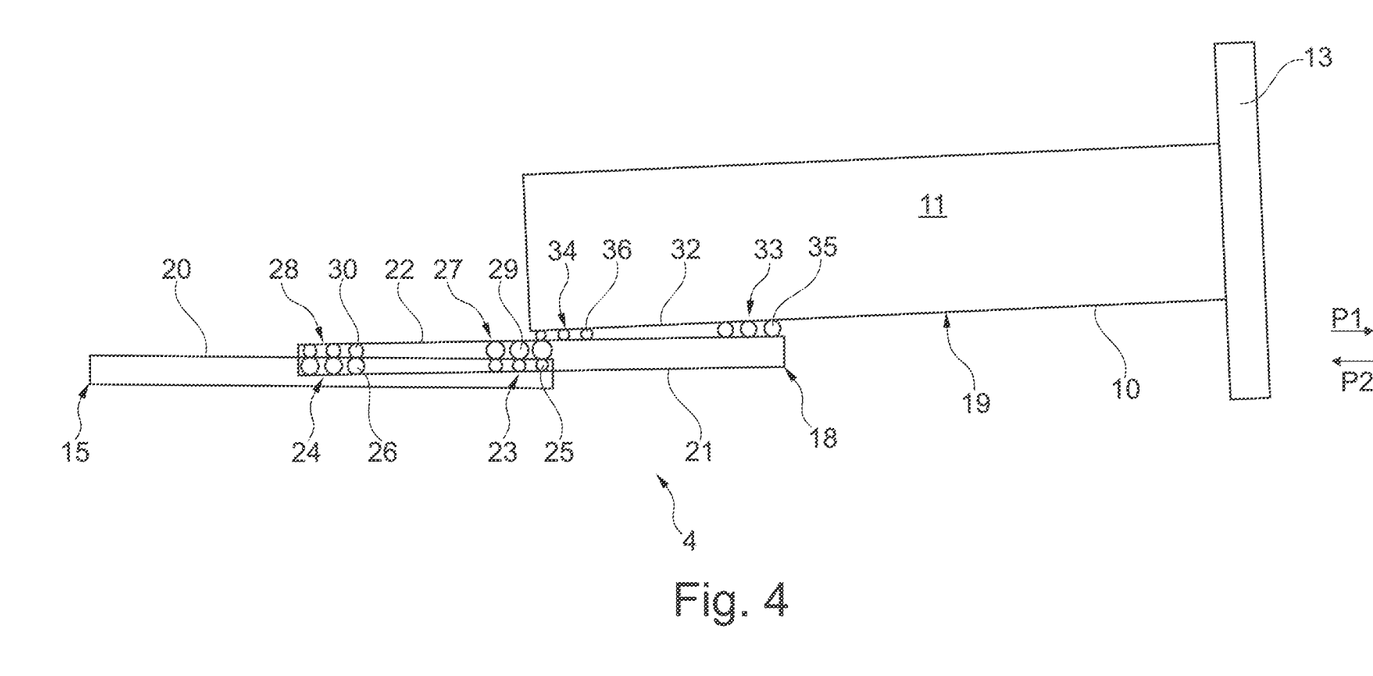
FIG. 4 shows a side view of a drawer with mounted device according to FIG. 3 in the open state of the drawer.

In FIGS. 2 to 4, a first variant of the device 4 according to the present invention is shown, wherein a running web 20 of the carcass rail 15 is arranged between two running webs 21, 22 of the central rail 18. The running web 20 of the carcass rail 15 is preferably oriented horizontally in the mounted state on the piece of furniture 1, and the two running webs 21, 22 of the central rail 18 are oriented obliquely relative to the horizontally oriented running web 20 of the carcass rail 15. The oblique position of the running webs 21, 22 of the central rail 18 is achieved in that rolling elements with different diameters are arranged between the running webs 21, 22 of the central rail 18 and the running web 20 of the carcass rail 15.

Preferably, two rolling element rows 23, 24 are arranged between the running web 20 of the carcass rail 15 and a lower running web 21 of the central rail 18. The rolling element rows 23, 24 preferably each have identical rolling elements 25, 26, wherein the rolling elements 25 in a rolling element row 23 have the same diameters. Two rolling element rows 27, 28 with rolling elements 29, 30 are also preferably arranged between the running web 20 of the carcass rail 15 and an upper running web 22 of the central rail 18. In order to obtain an oblique position of the running webs 21, 22 of the central rail 18, the rolling elements 25 of a rolling element row 23 which are arranged at the front in the opening direction P1 advantageously have a smaller diameter than the rolling elements 26 of a rolling element row 24 which are arranged at the rear in the two rolling element rows 23, 24 which are arranged between the lower running web 21 of the central rail 18 and the running web 20 of the carcass rail 15. In the two rolling element rows 27, 28, in which the rolling elements 29, 30 are arranged between an upper running web 22 of the central rail 18 and the running web 20 of the carcass rail 15, the rolling elements 29 of a rolling element row 27, which are arranged at the front in the opening direction P1, advantageously have a larger diameter than the rolling elements 30 of a rolling element row 28, which are arranged at the rear.

The four rolling element rows 23, 24, 27, 28 are preferably arranged on a rolling element carriage 31. Furthermore, it is conceivable that two rolling element rows 23, 27 are arranged on a first rolling element carriage and the other two rolling element rows 24, 28 are arranged on a second rolling element carriage.

The rolling elements 25, 26, 29, 30 advantageously all have different diameters, wherein the rolling elements of an associated rolling element row have the same diameter.

A running web 32 of the drawer rail 19 is preferably arranged above the upper running web 22 of the central rail 18. It is furthermore preferred that two rolling element rows 33, 34 with rolling elements 35, 36 are arranged between the running web 32 of the drawer rail 19 and the upper running web 22 of the central rail 18, wherein the rolling elements 35 of a rolling element row 33 which are at the front in the opening direction P1 have a larger diameter than the rolling elements 36 of a rolling element row 34 which are arranged further toward the rear. The rolling element rows 33, 34 are preferably arranged on a further rolling element carriage 37. For example, the movement of the rolling element carriages 31, 37 can be synchronized with one another, with the result that, during the opening movement of the movable furniture part 3 in the opening direction P1, both the central rail 18 and the drawer rail 19 are moved simultaneously in the opening direction P1.

As a result of the configuration or the different diameters of the rolling elements 25, 26, 29, 30, 35, 36, the running webs 21, 22 of the central rail 18 and the running web 32 of the drawer rail 19 are already oriented obliquely relative to the horizontally oriented running web 20 of the carcass rail 15 in the closed state of the drawer (see FIG. 3). Furthermore, the running web 32 of the drawer rail 19, on which the movable furniture part 3 preferably rests, is preferably oriented obliquely relative to the upper running web 22 of the central rail 18. During the opening of the movable furniture part 3 in the opening direction, this oblique position of the running webs 21, 22 of the central rail 18 and the running web 32 of the drawer rail 19 is not changed (see FIG. 4). This ensures that lowering of the movable furniture part 3 is prevented since the weight of the heavy movable furniture part 3 acts on the drawer rail 19, above all in the open state of the movable furniture part 3, as a result of which the oblique position of the running web 32 of the drawer rail 19 is compensated by the weight of the movable furniture part 3.

Figure 5:
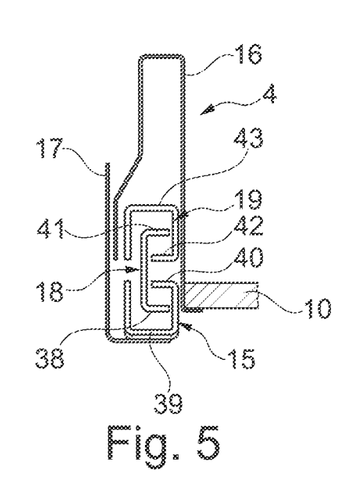
FIG. 5 shows a highly schematic sectional illustration of a part of a drawer and an alternative device without rolling elements according to FIG. 1.
Figure 6:
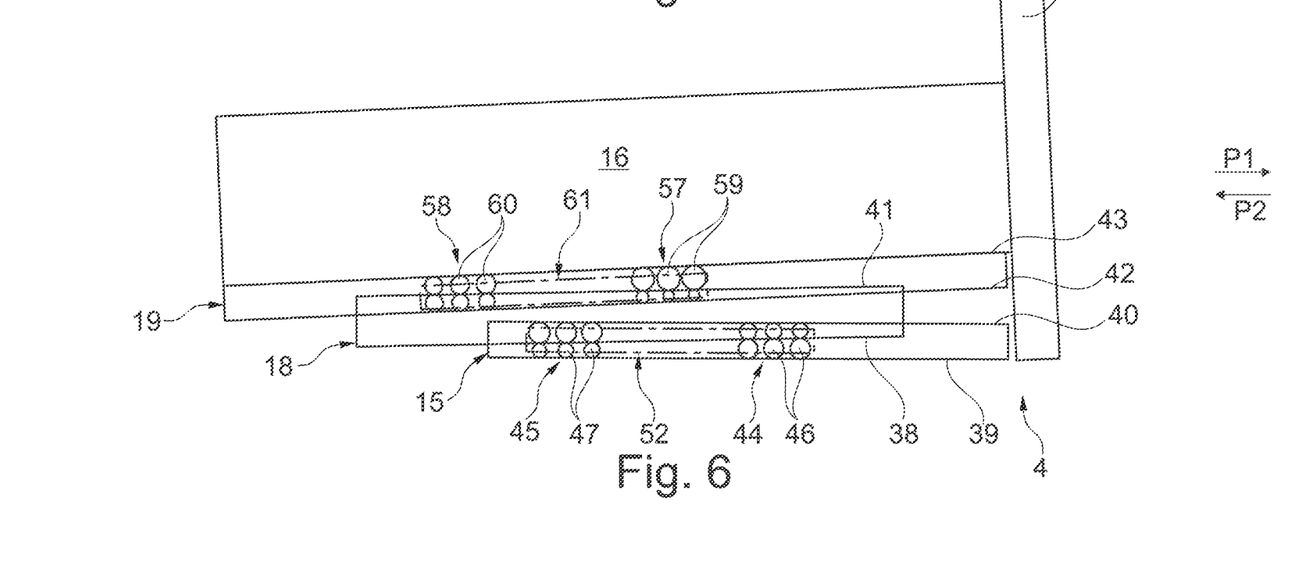
FIG. 6 shows a side view of a drawer with mounted device according to FIG. 5 in the closed state of the drawer.
Figure 7:
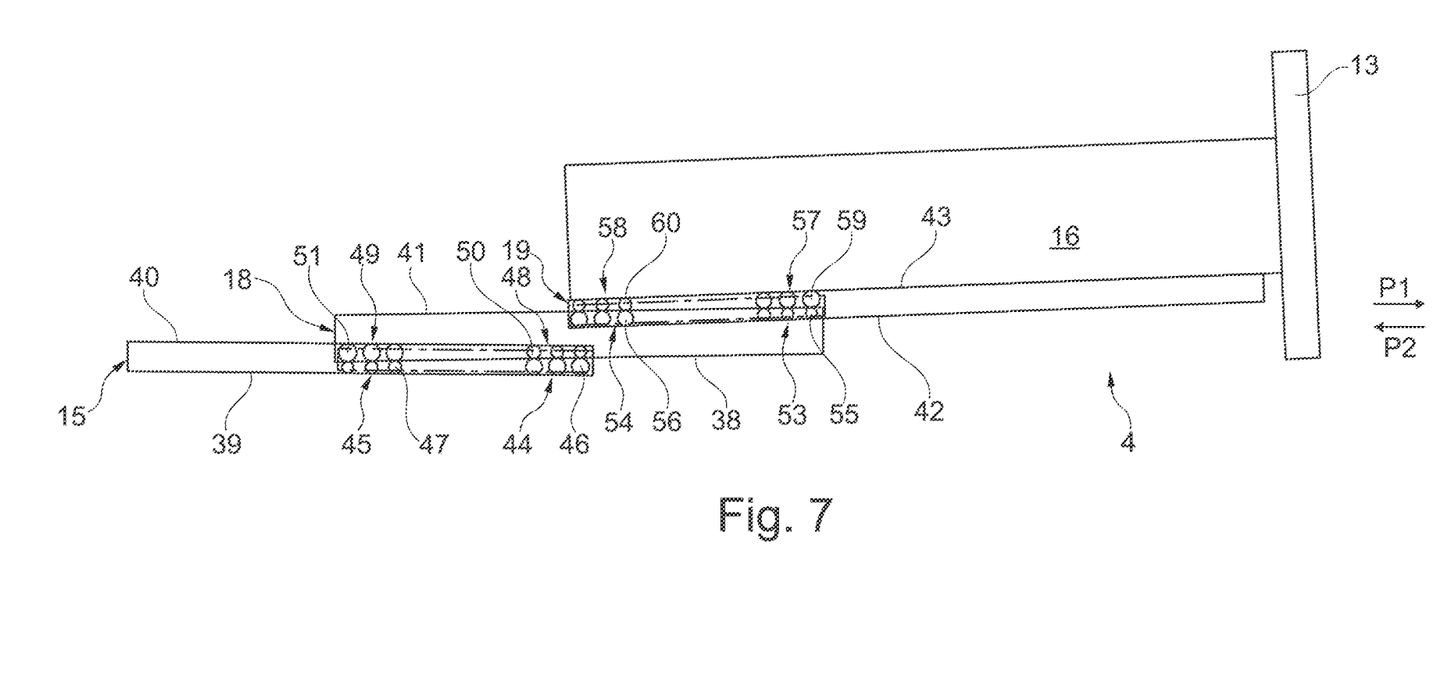
FIG. 7 shows a side view of a drawer with mounted device according to FIG. 6 in the open state of the drawer.

A further variant of the device 4 is shown in FIGS. 5 to 7, in which a lower running web 38 of the central rail 18 is arranged between precisely two horizontally aligned running webs 39, 40 of the carcass rail 15 and an upper running web 41 of the central rail 18 is arranged between precisely two running webs 42, 43 of the drawer rail 19.

Preferably, two rolling element rows 44, 45 are arranged between the lower running web 38 of the central rail 18 and the lower running web 29 of the carcass rail 15; the rolling element rows 44, 45 preferably each have rolling elements 46, 47 of the same type. Two rolling element rows 48, 49 with rolling elements 50, 51 are also preferably arranged between the lower running web 38 of the central rail 18 and the upper running web 40 of the carcass rail 15. In order to obtain an oblique position of the running web 38 of the central rail 18, the rolling elements 46 of the rolling element row 44 which are arranged at the front in the opening direction P1 advantageously have a larger diameter than the rolling elements 47 of the rolling element row 45 which are arranged at the rear, in the two rolling element rows 44, 45 which are arranged between the lower running web 38 of the central rail 18 and the lower running web 39 of the carcass rail 15. In the two rolling element rows 48, 49, in which the rolling elements 50, 51 are arranged between an upper running web 40 of the carcass rail 15 and the lower running web 38 of the central rail 18, the rolling elements 50 of a rolling element row 48, which are arranged at the front in the opening direction P1, advantageously have a smaller diameter than the rolling elements 51 of a rolling element row 49, which are arranged at the rear.

The four rolling element rows 44, 45, 48, 49 are preferably arranged on a rolling element carriage 52.

Preferably, two rolling element rows 53, 54 are arranged between the upper running web 41 of the central rail 18 and the lower running web 42 of the drawer rail 19; the rolling element rows 53, 54 preferably each have rolling elements 55, 56 of the same type. Two rolling element rows 57, 58 with rolling elements 59, 60 are also preferably arranged between the upper running web 41 of the central rail 18 and the upper running web 43 of the drawer rail 19. The rolling elements 55 of the rolling element row 53 which are arranged at the front in the opening direction P1 advantageously have a smaller diameter than the rolling elements 56 of the rolling element row 54 which are arranged at the rear, in the two rolling element rows 53, 54 which are arranged between the upper running web 41 of the central rail 18 and the lower running web 42 of the drawer rail 19. In the two rolling element rows 57, 58, in which the rolling elements 59, 60 are arranged between an upper running web 41 of the central rail 18 and the upper running web 43 of the drawer rail 19, the rolling elements 59 of a rolling element row 57, which are arranged at the front in the opening direction P1, advantageously have a larger diameter than the rolling elements 60 of a rolling element row 58, which are arranged at the rear.

The four rolling element rows 53, 54, 57, 58 are preferably arranged on a rolling element carriage 61. For example, the movement of the rolling element carriages 52, 61 can be synchronized with one another, with the result that, during the opening movement of the movable furniture part 3 in the opening direction P1, both the central rail 18 and the drawer rail 19 are moved simultaneously in the opening direction P1.

As a result of the configuration or the different diameters of the rolling elements 46, 47, 50, 51, 55, 56, 59, 60, the running webs 38, 41 of the central rail 18 and the running webs 42, 43 of the drawer rail 19 are already oriented obliquely relative to the running webs 39, 40 of the carcass rail 15 in the closed state of the drawer (see FIG. 6).

Furthermore, the running webs 42, 43 of the drawer rail 19 are preferably oriented obliquely relative to the running webs 38, 41 of the central rail 18. During the opening of the movable furniture part 3 in the opening direction P1, this oblique position of the running webs 38, 41 of the central rail 18 and the running webs 42, 43 of the drawer rail 19 is not changed (see FIG. 7). This ensures that lowering of the movable furniture part 3 is prevented since the weight of the heavy movable furniture part 3 acts on the drawer rail 19, above all in the open state of the movable furniture part 3, as a result of which the oblique position of the running web 42, 43 of the drawer rail 19 is compensated by the weight of the movable furniture part 3.

LIST OF REFERENCE SIGNS 1 piece of furniture
2 furniture carcass
3 furniture part
4 device
5 base
6 upper panel
7 rear wall
8 side wall
9 side wall
10 drawer bottom
11 drawer side wall
12 drawer side wall
13 drawer front
14 drawer rear wall
15 carcass rail
16 side frame
17 fastening plate
18 central rail
19 drawer rail
20 running web
21 running web
22 running web 23 rolling element row
24 rolling element row
25 rolling element
26 rolling element
27 rolling element row
28 rolling element row
29 rolling element
30 rolling element
31 rolling element carriage
32 running web
33 rolling element row
34 rolling element row
35 rolling element
36 rolling element
37 rolling element carriage
38 running web
39 running web
40 running web
41 running web
42 running web
43 running web
44 rolling element row
45 rolling element row
46 rolling element
47 rolling element
48 rolling element row
49 rolling element row
50 rolling element
51 rolling element
52 rolling element carriage
53 rolling element row
54 rolling element row
55 rolling element
56 rolling element
57 rolling element row
58 rolling element row
59 rolling element
60 rolling element
61 rolling element carriage

The invention claimed is:

1. A device for guiding a movable furniture part adapted to be received movably on a furniture carcass by means of the device, the device comprising:
   a carcass rail; and
   a movable rail,
   wherein the carcass rail can be arranged on the furniture carcass,
   wherein the movable rail can be moved in opening and closing directions relative to the carcass rail,
   wherein the carcass rail and the movable rail each have a flat running web,
   wherein load-transmitting rolling elements are each arranged between the running webs of the carcass rail and the movable rail,
   wherein, during a relative movement between the movable rail and the carcass rail, the load-transmitting rolling elements can be moved along the running webs of the carcass rail and the movable rail,
   wherein the running web of the carcass rail and the running web of the movable rail are uninterrupted, and
   wherein the rolling elements between the carcass rail and the movable rail are configured such that, in a mounted state, the running web of the movable rail is always oriented obliquely relative to the horizontally oriented running web of the carcass rail.

2. The device as claimed in claim 1, further comprising a rolling element carriage having rolling element rows, each of the rolling element rows having a plurality of the rolling elements.

3. The device as claimed in claim 2, wherein a diameter of all of the rolling elements of one of the rolling element rows are the same.

4. The device as claimed in claim 1, further comprising a single rolling element carriage having four rolling element rows, wherein two of the rolling element rows are located between the running web of the carcass rail and an upper running web of the movable rail, and two of the rolling element rows are located between the running web of the carcass rail and a lower running web of the movable rail.

5. The device as claimed in claim 1, further comprising a single rolling element carriage having four rolling element rows, wherein two of the rolling element rows are located between the running web of the movable rail and an upper running web of the carcass rail, and two of the rolling element rows are located between the running web of the movable rail and a lower running web of the carcass rail.

6. The device as claimed in claim 1, further comprising two rolling element carriages each having two rolling element rows.

7. The device as claimed in claim 4, wherein the rolling elements of two of the rolling element rows each have different diameters, and
   wherein one of the rolling element rows is arranged between the running web of the carcass rail and the upper running web of the movable rail and one of the rolling element rows is arranged between the running web of the carcass rail and the lower running web of the movable rail.

8. The device as claimed in claim 5, wherein the rolling elements of two of the rolling element rows each have different diameters, and
   wherein one of the rolling element rows is arranged between the running web of the movable rail and the upper running web of the carcass rail, and one of the rolling element rows is arranged between the running web of the movable rail and the lower running web of the carcass rail.

9. The device as claimed in claim 1, wherein a diameter of the rolling elements of one of the rolling element rows, which is at a front in the opening direction, is different from a diameter of the rolling elements of a rear rolling element row.

10. The device as claimed in claim 1, wherein a sum of diameters of the rolling elements of the two rolling element rows, which are at a front in the opening direction, is equal to a sum of diameters of the rolling elements of two rear rolling element rows.

11. The device as claimed in claim 1, wherein the movable rail is a drawer rail.

12. The device as claimed in claim 1, wherein the movable rail is a central rail.

13. The device as claimed in claim 1, wherein the device has two of the movable rails, and
   wherein a first one of the movable rails is designed as a central rail, and a second one of the movable rails is designed as a drawer rail.

14. The device as claimed in claim 2, wherein two of the rolling element rows are arranged between a running web of a drawer rail and a running web of a central rail, and
   wherein the rolling elements of one of the rolling element rows have a different diameter than that of the rolling elements of the other of the rolling element rows.

15. A piece of furniture having a movable furniture part and a furniture carcass, wherein the movable furniture part can be moved in opening and closing directions, being guided relative to the furniture carcass, by the device as claimed in claim 1.

\* \* \* \* \*